US011722579B2

(12) United States Patent
Zhang

(10) Patent No.: US 11,722,579 B2
(45) Date of Patent: *Aug. 8, 2023

(54) DEPENDENCY MANAGEMENT FOR SHARED DATA OBJECTS IN A DATABASE SYSTEM

(71) Applicant: salesforce.com, inc., San Francisco, CA (US)

(72) Inventor: Rui Zhang, Fremont, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/503,464

(22) Filed: Oct. 18, 2021

(65) Prior Publication Data

US 2022/0247832 A1 Aug. 4, 2022

Related U.S. Application Data

(63) Continuation of application No. 17/162,728, filed on Jan. 29, 2021, now Pat. No. 11,153,408.

(51) Int. Cl.
*H04L 67/568* (2022.01)
*H04L 67/1097* (2022.01)
(Continued)

(52) U.S. Cl.
CPC .......... *H04L 67/568* (2022.05); *H04L 67/025* (2013.01); *H04L 67/1097* (2013.01);
(Continued)

(58) Field of Classification Search
CPC . H04L 67/00–67/2866; G06F 16/20–16/2393; G06F 16/25; G06F 16/28–16/289; G06F 16/30–16/328
See application file for complete search history.

(56) References Cited

U.S. PATENT DOCUMENTS 9,607,017 B2 3/2017 Debray et al.
10,365,900 B2 7/2019 Snodgrass et al.
(Continued)

OTHER PUBLICATIONS

Inverted index; Wikipedia; https://en.wikipedia.org/w/index.php?title=Inverted_index&oldid=951292132; page was last edited on Apr. 16, 2020; 3 pages.
(Continued)

*Primary Examiner* — Clayton R Williams
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to managing dependencies between shared data objects in a database system. In various embodiments, a data storage system may maintain a function cache that is operable to store functions that are accessible to one or more applications hosted by a server system. In response to a request to invalidate a first data type utilized by one or more of these functions, various embodiments may include accessing an inverted index that specifies a mapping between data types and corresponding functions, stored in the function cache, which depend on those data types. Using the inverted index, various embodiments include identifying a set of functions that depend on the first data type and invalidating the set of functions in the function cache such that the set of functions are no longer accessible by the applications.

20 Claims, 8 Drawing Sheets

*600*

602
Receive a request to invalidate a first function stored in a function cache

604
In response to the request, access a first inverted function-dependency list corresponding to the first function, where the first inverted function-dependency list specifies a subset of functions, from a plurality of functions in the function cache, that depend on the first function 606
Invalidate each function in the subset of functions 608
Delete the function F₁ from the function cache

(51) Int. Cl.
*H04L 67/025* (2022.01)
*H04L 67/55* (2022.01)
*G06F 16/30* (2019.01)
*G06F 16/28* (2019.01)
*G06F 16/20* (2019.01)

(52) U.S. Cl.
CPC .............. *H04L 67/55* (2022.05); *G06F 16/20* (2019.01); *G06F 16/28* (2019.01); *G06F 16/30* (2019.01)

(56) References Cited

U.S. PATENT DOCUMENTS

| | | | |
|---|---|---|---|
| 2004/0136386 A1* | 7/2004 | Miller | H04L 67/564 370/389 |
| 2015/0074350 A1* | 3/2015 | Chiang | G06F 12/0875 711/118 |
| 2016/0012044 A1* | 1/2016 | Franceschini | G06F 16/951 707/722 |

OTHER PUBLICATIONS

Pl/sql function result cache in 11g; http://www.oracle-developer.net/display.php?id=504, 23 pages. [Retrieved Jan. 10, 2021].
Czuprynski, "Oracle Database 11g: PLSQL and OCI Result Set Caching," Aug. 27, 2008, Database Journal, pp. 1-5 (Year: 2008).
Foote, "12.2 Index Deferred Invalidation (Atomica)", May 30, 2017, Richard Foote's Oracle Blog, pp. 1-11 (Year: 2017).

* cited by examiner

300

Function 152A

Data Type-Dependency List 154A: Data Type 157A

Inverted Function-Dependency List: 156A: Function 152B

Function 152B

Data Type-Dependency List 154B: Data Type 157A

Inverted Function-Dependency List 156B: Function 152C

Function 152C

Data Type-Dependency List 154C: Data Type 157A, Data Type 157B

Inverted Function-Dependency List 156C: null

Function 152D

Data Type-Dependency List 154D: Data Type 157B

Inverted Function-Dependency List 156D: Function 152E

Function 152E

Data Type-Dependency List 154E: Data Type 157N

Inverted Function-Dependency List 156E: null

502 — Receive a request to invalidate a first data type utilized by one or more functions stored in a function cache

504 — In response to the request, access a first inverted index that specifies a mapping between a plurality of data types and corresponding functions, from the function cache, that depend on the plurality of data types

506 — Using the first inverted index, identify a set of functions, from the plurality of functions, that depend on the first data type

508 — For each function $F_i$ in the set of functions:

510 — Access $F_i$'s data type-dependency list

512 — For each data type $T_j$ in $F_i$'s data-type dependency list:

-Look up $T_j$ in the first inverted index; and
-Remove $F_i$ from $T_j$'s function list in the first inverted index

514 — Invalidate $F_i$ from the function cache

*FIG. 5*

DEPENDENCY MANAGEMENT FOR SHARED DATA OBJECTS IN A DATABASE SYSTEM

PRIORITY CLAIM

The present application is a continuation of U.S. application Ser. No. 17/162,728, filed Jan. 29, 2021 (now U.S. Pat. No. 11,153,408), which is incorporated by reference herein in its entirety.

BACKGROUND

Technical Field

This disclosure relates generally to database systems, and more particularly to managing dependencies between data objects in a database system.

Description of the Related Art

Server systems, such as those that provide computing resources to various remote users (e.g., as part of one or more web services), typically include one or more database servers that use databases to store data on behalf of end users. In some instances, a database server may utilize a function cache to store procedural language functions in shared memory, allowing database connections to the same database server to execute the same set of procedural language functions from the function cache. Dependencies may arise between the functions (and other data objects) stored in the function cache. For example, a function may call another function, creating a dependency between the two functions, or a function may utilize a variable of a particular data type, creating a dependency between the function and the data type.

In some instances, changes may be made to the data objects stored in the function cache (e.g., to update a function or modify a data type). Accordingly, as data objects are modified in the function cache, the system may invalidate the function or data type that has been changed as well as any other functions (or other data objects) that depend on the function or data type that has been changed. Invalidating data objects in the function cache presents various technical challenges, however, and in many instances can be a time-consuming and computationally expensive task.

BRIEF DESCRIPTION OF THE DRAWINGS

FIG. 3 is a block diagram illustrating example data type-dependency lists and inverted function-dependency lists, according to some embodiments.

FIG. 5 is a flow diagram illustrating an example method for invalidating functions by data type using an inverted index, according to some embodiments.

DETAILED DESCRIPTION

Figure 1:
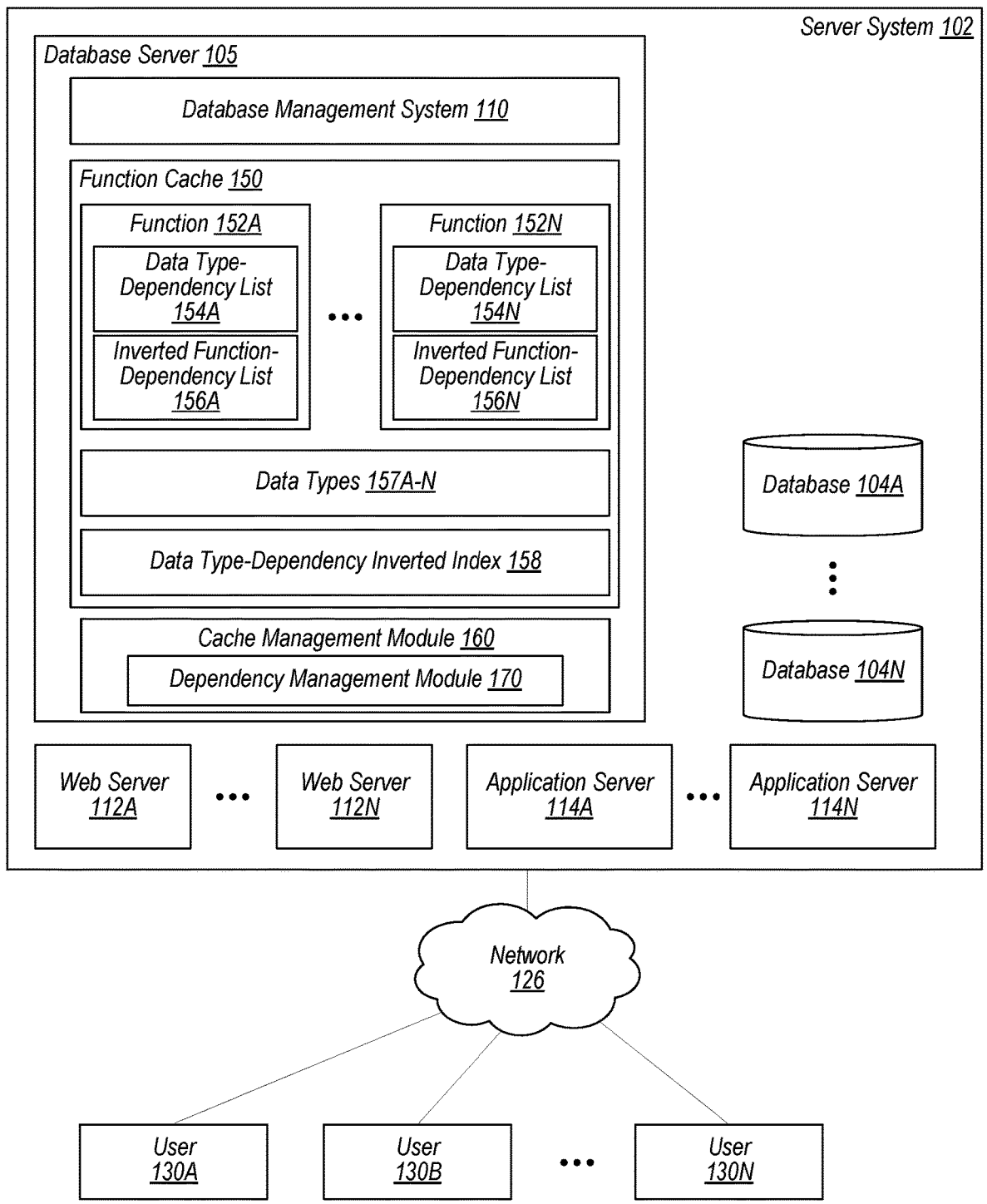
FIG. 1 is a block diagram that depicts an example server system that includes a database server implementing a function cache, according to some embodiments.

In large-scale server systems that provide computing resources to various remote users (e.g., as part of one or more web services), databases are frequently accessed and the data stored therein frequently modified. For example, a server system may include one or more database servers hosting a database management system that is capable of creating, reading, updating, and deleting data from one or more (and possibly many) databases on behalf of end users. To expand their capabilities, many database management systems provide or allow procedural language extensions that enable developers to utilize various features of procedural programming, such as the definition of data types and functions that utilize variables of those data types.

In some instances, a database server may utilize a function cache to store procedural language functions in shared memory. In such instances, database connections to the same database server may execute the same set of procedural language functions from the function cache, enabling highly concurrent execution of the functions. Utilizing a function cache may provide various technical benefits. For example, when a function is executed, the syntax of its textual body is first parsed and then compiled into an executable format. In systems that do not utilize a function cache, each database connection must compile a function before executing it. In instances in which multiple different applications often utilize the same set of functions, however, this approach is both unnecessarily slow and computationally expensive. Utilizing a function cache, however, a function needs to be compiled only once. For example, once a function has been compiled, the resulting executable may be stored in the function cache so that subsequent executions of the function, by the various applications connected to the database server, do not have to recompile the function prior to its use, which may significantly reduce the associated time and computational expense.

Various dependencies may arise between the functions (and other data objects) stored in the function cache. For example, a function may call another function, creating a dependency between the two functions. More specifically, if a Function A calls a Function B, then Function A depends on Function B. Similarly, when a function uses a variable of a certain data type, a dependency between this function and the data type is established. For example, if Function A utilizes one or more variables of Data Type T, Function A then depends on Data Type T. It is important to maintain these dependencies accurately, as the dependencies between data objects may affect the correctness of the functions as they are executed. In many instances, however, changes may be made to the data objects stored in the function cache, for example to update a function or modify a data type. When this occurs, the data object (e.g., function, data type, etc.) that has been changed ceases to exist, and other objects that depend thereon will no longer be valid. Accordingly, as data objects are modified in the function cache, the system may invalidate the function or data type that has been changed as well as any other functions (or other data objects) that depend on the function or data type that has been changed.

For example, assume that a developer wants to update Data Type T on which various functions in the function cache depend. In this scenario, Data Type T and all functions that depend, either directly or indirectly, on Data Type T may need to be invalidated in the function cache. As an additional example, assume that a developer updates Function B on which Function A depends. In this non-limiting example, the system may invalidate both of Functions A and B from the function cache and recompile these functions before subsequent executions. Note that, in many instances, the invalidation of these functions may lead to additional invalidations to the functions that depend on the previously-invalidated functions. As an example, if Function C depends on Function A, then the invalidation of Function A will, in turn, trigger the invalidation of function C. Stated differently, invalidations may propagate through all the functions in which a dependency is present.

Invalidating data objects in the function cache presents various technical challenges, however. For example, it is typically desirable to invalidate functions in a synchronized manner among the many database connections such that, when a function is invalidated, no database connection can execute this function anymore. In such instances, attempts to execute this function will be blocked until the function is recompiled. In a highly concurrent execution environment, a longer invalidation period can negatively impact the response time of database requests. Accordingly, it is important to invalidate data objects in the function cache efficiently so as not to negatively impact the performance of the function cache and the system in which it is implemented. Since invalidation is driven by the identification of dependencies between data objects (e.g., dependencies between a data type and the functions that use the data type, between a function and other functions that depend on the function), building an efficient dependency lookup mechanism and the associated invalidation algorithm is of great importance to the performance of the function cache and the system as a whole.

Prior techniques for identifying dependencies between data objects and invalidating the identified data objects suffer from various technical shortcomings. For example, using prior techniques, invalidation is performed by iterating through all of the functions in the function cache to determine whether they depend on the object being invalidated. Additionally, using prior techniques, once a function is invalidated, the function cache is scanned iteratively to further identify functions that depend on the previously invalidated function(s). This process can be very inefficient and time-consuming, particularly at scale (e.g., for a function cache with 1 million functions or more), due to the fact that all of the functions in the function cache must be visited.

In various embodiments, however, the disclosed techniques manage dependencies between shared data objects using inverted index-based dependency tracking. As described in detail below, by utilizing one or more inverted index data structures to track dependencies between data objects (e.g., dependencies between data types and functions, dependencies between two or more functions, etc.), the disclosed techniques may significantly reduce the time and computational resources needed to identify dependencies between data objects and invalidate the relevant data objects from the function cache, thereby improving the functioning of the function cache and the database system as a whole.

Referring now to FIG. 1, block diagram 100 depicts a server system 102 that includes databases 104, database server 105, web servers 112, and application servers 114. In the depicted embodiment, database server 105 includes database management system 110 and function cache 150.

In various embodiments, server system 102 may use web servers 112A-112N and application servers 114A-114N to host various web services for remote users 130 via network 126, using database server 105 to maintain and access associated data in one or more databases 104. As one non-limiting example, server system 102 may, in some embodiments, provide customer relationship management ("CRM") services for users 130. Note, however, that this embodiment is provided merely as an example and, in other embodiments, server system 102 may provide any suitable web service(s). As part of providing these web services, database server 105 may store data (and, typically, large amounts of data) in database 104 using various logical data structures. In various embodiments, database management system 110 may be implemented using any of various suitable technologies, such as Oracle™ RDBMS, IBM™ DB2, MySQL™, or any other suitable database management system. In operation, database management system 110 will store, access, modify, and delete various items of data on behalf of the users 130A-130N.

In various embodiments, function cache 150 is operable to store various functions 152A-152N (e.g., procedural language functions, such as PL/SQL functions), and various other data objects, for use by one or more applications hosted by any of the application servers 114. As noted above, in many instances, dependencies may be created between data objects stored in the function cache 150. For example, a given function 152 may depend on multiple different data types 157 and may be used by one or more (and possibly many) other functions 152. Due to these interdependencies, a change made to one data object may lead to the need to invalidate all other data objects in the function cache 150 that depend on the now-modified data object. For example, a change to data type 157A may lead to the invalidation of all of the functions 152 that use data type 157A. Using prior techniques, identifying the functions 152 to invalidate in this scenario is both time-consuming and computationally expensive.

In various embodiments, however, the disclosed techniques may use one or more inverted indexes, such as data type-dependency inverted index 158, to efficiently identify the set of functions 152 that depend on data type 157A and, as such, are to be invalidated (in this non-limiting example). As used herein, the term "inverted index" is used in accordance with its understood meaning in the art and includes an index data structure that stores a mapping from a particular data element to a set of one or more locations (if any) in which that particular data element appears. In various disclosed embodiments, inverted indexes are used to track and manage the relationship between related data objects that are stored in the function cache 150. Consider, as one non-limiting example, the embodiment depicted in FIG. 1 in which the function cache 150 stores a data type-dependency inverted index 158. (Note that, although data type-dependency inverted index 158 is stored in function cache 150 in the depicted embodiment, this is provided merely as one non-limiting example. In other embodiments the data type-dependency inverted index 158 may be stored in any suitable storage location (e.g., on database server 105).)

Data type-dependency inverted index 158, according to one non-limiting embodiment, is described in detail below with reference to FIG. 2. For the purposes of the present discussion, note that, in various embodiments, data type-dependency inverted index 158 specifies a mapping between one or more data types 157 and corresponding functions 152 that depend on those data types 157. Using data type-dependency inverted index 158, the dependency management module 170 may identify functions 152 that depend on a particular data type 157 in a fast and computationally efficient manner. Note that, although a single inverted index is depicted in the embodiment depicted in FIG. 1, this simplified embodiment is provided merely as one non-limiting example. In other embodiments, the disclosed techniques may utilize multiple different inverted indexes to manage dependencies between different types of data objects stored in function cache 150 (or between data objects stored at any of various different locations within server system 102). For example, as described in more detail below with reference to FIG. 4, the disclosed techniques, in some embodiments, may create and maintain a dedicated inverted index for each of multiple different types of data objects, which may be used (e.g., by dependency management module 170) to track dependencies between data objects of these different object types.

In the depicted embodiment, database server 105 hosts cache management module 160, which includes dependency management module 170. In various embodiments, cache management module 160 and dependency management module 170 are operable to perform various maintenance operations associated with the function cache 150 to ensure that the data objects stored therein (e.g., functions 152) are correct and up-to-date. For example, as described in more detail below with reference to FIGS. 5-6, when a modification is made to one or more functions 152 or data types 157, a message (e.g., an internal database engine message passed in a C-language function) may be sent to the function cache 150. In response to such a message, dependency management module 170 may perform various invalidation operations to invalidate the affected data objects (e.g., data types 157, functions 152, tables, indexes, or any of various other suitable types of data objects stored in the function cache 150). When a previously invalidated function 152 is subsequently executed (e.g., by an application hosted by one of application servers 114), the function 152 will be recompiled and stored in the function cache 150.

In various embodiments, the disclosed techniques may include maintaining, for each of the functions 152 stored in the function cache 150, a corresponding data type-dependency list 154 and an inverted function-dependency list 156. Non-limiting embodiments of data type-dependency lists 154 and an inverted function-dependency lists 156 are described in more detail below with reference to FIG. 3. For the purposes of the present discussion, note that a data type-dependency list 154, in various embodiments, indicates the data types 157 on which a given function 152 depends and that an inverted function-dependency list 156, in various embodiments, is a list that indicates, for a given function 152, all of the other functions 152 that depend on (e.g., call) the given function 152. Note that, in this disclosure, the inverted function-dependency lists 156 are said to be "inverted" because, rather than storing a "forward" list of other functions on which a given function depends, the list 156 is instead "inverted" and stores a list of those other functions that depend on the given function. In various embodiments, the data type-dependency lists 154 and inverted function-dependency lists 156 may be used (e.g., by dependency management module 170) to facilitate the fast and computationally efficient invalidation of functions 152 from the function cache 150.

Figure 2:
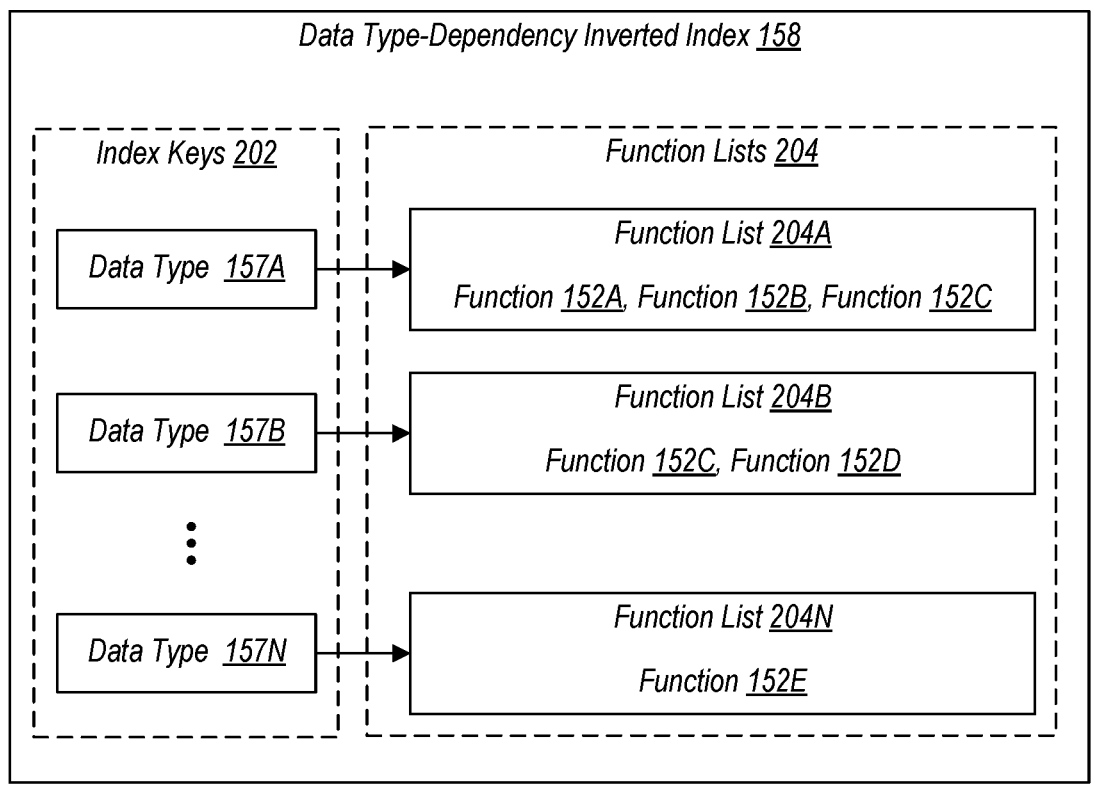
FIG. 2 is a block diagram illustrating an example data type-dependency inverted index, according to some embodiments.

Turning now to FIG. 2, block diagram 200 depicts an example data type-dependency inverted index 158, according to one non-limiting embodiment. In various embodiments, data type-dependency inverted index 158 may be used to track the dependencies between functions 152 in the function cache 150 and data types 157 on which those functions 152 depend. Note that, in various embodiments, by employing an inverted index to manage the dependencies between functions 152 and data types 157, dependency management module 157 does not need to iterate through all of the functions 152 in the function cache 150 to invalidate functions 152 by a particular data type 157. Instead, in various embodiments, the dependency management module 170 simply evaluates and removes only those functions 152 that are associated with the data type 157 being modified, significantly reducing the overhead of performing invalidation.

In the depicted embodiment, data type-dependency inverted index 158 specifies a mapping between one or more data types 157 and one or more corresponding functions 152 that depend on those data types 157. More specifically, in FIG. 2, identifiers for the different data types 157A-157N are used as the index keys 202 in the data type-dependency inverted index 158 and the values associated with each of the data types 157 is a function list 204 that specifies the function(s) 152 that depend on a given data type 157. For example, in the non-limiting embodiment of FIG. 2, data type-dependency inverted index 158 specifically depicts three index keys 202—data type 157A, data type 157B, and data type 157N—and three values associated with those index keys 202—function list 204A, function list 204B, and function list 204N (respectively). In this example, the function list 204A specifies that functions 152A, 152B, and 152C depend on data type 157A, the function list 204B specifies that functions 152C and 152D depend on data type 157B, and function list 204N specifies that function 152E depends on data type 157N.

Note that, in various embodiments, a function 152 may depend on multiple different data types 157 and, as such, may appear in multiple different function lists 204 in the data type-dependency inverted index 158. Consider, for example, function 152C shown in FIG. 2, which depends on both data types 157A and 157B. Accordingly, in the depicted embodiment, the function lists 204A and 204B for both data type 157A and data type 157B, respectively, contain references to function 152C. In various embodiments, the data type-dependency inverted index 158 may be updated as changes are made to the various data types 157 and functions 152 to ensure that the data type-dependency inverted index 158 accurately describes the interdependencies between the data types 157 and the functions 152 that use them.

For example, when a data type 157 (data type 157C, for example) is created, e.g., through a SQL CREATE statement, the dependency management module 170 may create an entry in the data type-dependency inverted index 158 corresponding to that data type 157C. When a function 152 (function 152G, for example) is created that utilizes one or more variables of data type 157C, the dependency management module 170 may insert a reference to function 152G into the function list 204C associated with the data type 157C. Accordingly, in various embodiments, the data type-dependency inverted index 158 may grow as the number of data types 157 and functions 152 in use grows.

Further, in various embodiments, the entries in the data type-dependency inverted index 158 may be updated as the data types 157 and functions 152, and the dependencies between them, change. For example, when a function 152 that appears on multiple function lists 204 is invalidated, the dependency management module 170 may use the data type-dependency inverted index 158 to remove references to that function 152 from the various function lists 204. Referring again to the embodiment depicted in FIG. 2, for instance, when one of the data types 157 (e.g., data type 157A) is changed, function 152C becomes outdated and the dependency management module 170 may remove references to function 152C from the function list 204A associated with the changed data type 157A. Further, in this example, the dependency management module 170 may also remove references to the function 152C from all other function lists in which this function appears (e.g., function list 204B). This process, described in more detail below with reference to FIG. 5, may be facilitated by maintaining, for each of the functions 152A-152N, a corresponding data type-dependency list 154, according to some embodiments.

Referring now to FIG. 3, block diagram 300 depicts an example of data type-dependency lists 154 and inverted function-dependency lists 156 associated with various functions 152, according to some embodiments. More specifically, FIG. 3 builds on the example introduced above with reference to FIG. 2 and depicts five functions 152A-152E, each of which includes a corresponding data type-dependency list 154 and an inverted function-dependency list 156.

As noted above, a data type-dependency list 154, in various embodiments, indicates the data types 157 on which a given function 152 depends. For example, in the depicted embodiment, data type-dependency list 154A indicates that function 152A depends on data type 157A, data type-dependency list 154B indicates that function 152B depends on data type 157A, data type-dependency list 154C indicates that function 152C depends on data types 157A and 157B, data type-dependency list 154D indicates that function 152D depends on data type 157B, and data type-dependency list 154E indicates that function 152E depends on data type 157N.

As noted above, a function 152 may depend on one or more other functions 152. In various embodiments, the disclosed techniques may also be used to track dependencies between functions 152. For example, in various embodiments, dependency management module 170 may use one or more inverted function-dependency lists 156 to track and manage dependencies between the various functions 152 in the function cache 150. An inverted function-dependency list 156, in various embodiments, is a list that indicates, for a given function 152, all of the other functions 152 that call the given function 152. Stated differently, the functions 152 included in a given inverted function-dependency list 156 depend on the function 152 with which the inverted function-dependency list 156 is associated. For example, in the depicted embodiment, inverted function-dependency list 156A indicates that function 152B depends on (e.g., calls) function 152A, inverted function-dependency list 156B indicates that function 152C depends on function 152B, inverted function-dependency list 156C indicates that no functions depend on function 152C, inverted function-dependency list 156D indicates that function 152E depends on function 152D, and inverted function-dependency list 156E indicates that no functions depend on function 152E.

Note that, in various embodiments, by utilizing the inverted function-dependency lists 156 to manage the dependencies amongst sets of functions, the disclosed techniques are not required to create additional storage for a separate inverted index. Instead, in various embodiments, the information that would be included in a separate inverted index is stored within and distributed across the various functions 152A-152N. In some such embodiments, the invalidation of functions 152 is performed in a recursive manner by traversing just those functions 152 that, as indicated by the relevant inverted function-dependency list(s) 156, are related through dependency.

In FIGS. 1-3, various embodiments of the disclosed techniques have been described with reference to the invalidation of functions 152 and data types 157 from a function cache 150. Note, however, that these embodiments are provided merely as non-limiting example. In various embodiments, the disclosed techniques may be used to track and manage dependencies between any number and type of data objects in any type of data storage system.

Figure 4:
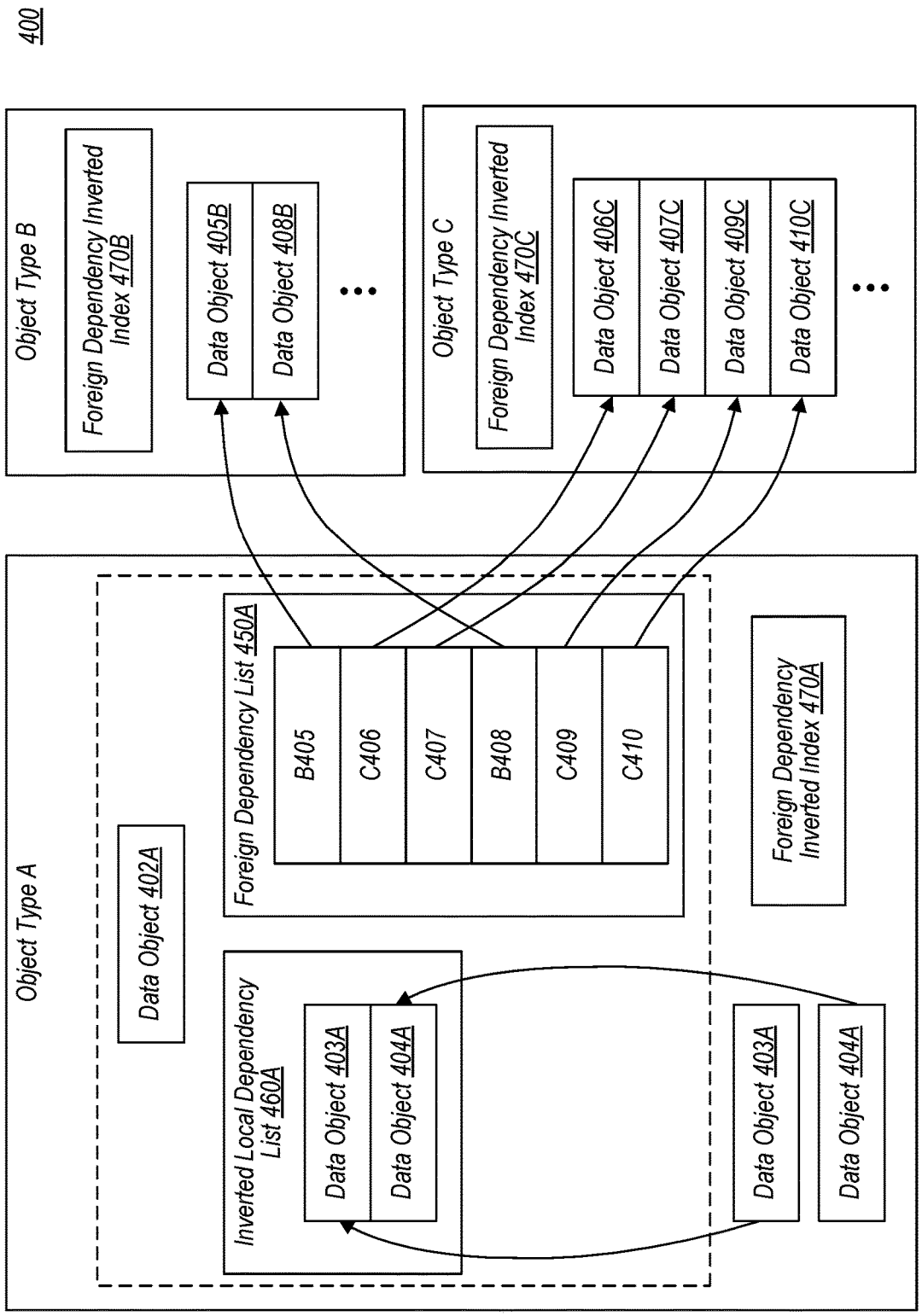
FIG. 4 is a block diagram illustrating example inverted index data structures used to track dependencies between data objects, according to some embodiments.

Turning now to FIG. 4, block diagram 400 depicts an example embodiment in which the disclosed techniques are used to manage and track dependencies between various types of data objects. More specifically, block diagram 400 depicts three different object types—object type A, object type B, and object type C. As one non-limiting example, object type A may correspond to functions 152, object type B may correspond to data types 157, and object type C may correspond to database tables. Note, however, this example is provided merely for illustration and, in other embodiments, object types A, B, and C may correspond to any of various suitable object types.

FIG. 4 depicts three data objects 402A, 403A, and 404A of object type A, two data objects 405B and 408B of object type B, and four data objects 406C, 407C, 409C, and 410C of object type C. In the embodiment shown in FIG. 4, two different types of dependencies are depicted with regard to these three object types: "foreign dependencies," which are dependencies established between different types of objects, and "local dependencies," which are dependencies among the same types of objects. Note that, in FIG. 4, only the dependencies associated with example data object 402A are shown, for clarity. In the depicted embodiment, these dependencies include foreign dependencies associated with two other types of data objects (object type B and object type C) and local dependencies with two data objects of the same type (object type A). In this example, the direction of the arrows shown in block diagram 400 correspond to the direction of the dependency. For example, FIG. 4 indicates that 402A depends on data object 405B, where "B405" is an identifier of data object 405B. Note that, in the depicted embodiment, the foreign dependency information for data object 402A is stored in a single foreign dependency list 450A, and that objects of various object types are stored in this list 450A. Accordingly, in such embodiments, the identifiers for the data objects indicated in foreign dependency list 450A may be chosen such that each object may be uniquely identified by a distinct identifier across all object types. Further, in FIG. 4, the arrow from data object 403A to a corresponding entry in the inverted local dependency list 460A indicates that data object 403A depends on data object 402A.

Example data object 402A, in the depicted embodiment, includes corresponding foreign dependency list 450A and inverted local dependency list 460A corresponding to data object 402A. (Note that, although not separately shown for clarity, in various embodiments one or more of the other data objects depicted in FIG. 4 may also include corresponding foreign dependency lists 450 and inverted local dependency lists 460.) In various embodiments, foreign dependency list 450A indicates the foreign data objects on which the data object 402A depends. In the depicted embodiment, foreign dependency list 450A indicates that data object 402A depends on data object 405B and 408B (of object type B) and on 406C, 407C, 409C, and 410C (of object type C). Further, in various embodiments, inverted local dependency list 460A indicates the local data objects that depend on data object 402A. In the depicted embodiment, inverted local dependency list 460A indicates that data objects 403A and 404A both depend on data object 402A.

In the depicted embodiment, each of the object types A, B, and C include corresponding foreign dependency inverted indexes 470A, 470B, and 470C (respectively). In various embodiments, a foreign dependency inverted indexes 470 may be used to track dependencies between data objects of different object types. For example, foreign dependency inverted indexes 470A may be used to track dependencies between data objects of object type A and relatively foreign data objects that depend on the data object(s) of object type A. In the depicted embodiment, for example, foreign dependency inverted indexes 470B may specify that data object 402A depends on both data objects 405B and 408B, and foreign dependency inverted indexes 470C may indicate that data object 402A depends on each of data objects 406C, 407C, 409C, and 410C. In an embodiment in which object type A corresponds to functions 152 and object type B corresponds to data types 157 on which those functions 152 depend, for example, the foreign dependency inverted indexes 470B may identify those functions 152 that depend on the various data types 157, as described above with reference to FIG. 2.

Example Methods

Referring now to FIG. 5, a flow diagram illustrating an example method 500 for invalidating functions by data type using an inverted index is depicted, according to some embodiments. In various embodiments, method 500 may be performed by dependency management module 170 of FIG. 1 to invalidate one or more functions 152 from the function cache 150 in response to a modification to one of the data types 157. For example, server system 102 may include (or have access to) a non-transitory, computer-readable medium having program instructions stored thereon that are executable by the server system 102 to cause the operations described with reference to FIG. 5. In FIG. 5, method 500 includes elements 502-514. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the dependency management module 170 receives a request to invalidate a first data type 157 utilized by one or more functions 152 stored in the function cache 150. For example, with reference to the non-limiting example depicted in FIGS. 2-3, assume that dependency management module 170 receives a request to invalidate data type 157A. In this scenario, the dependency management module 170 may also invalidate, from function cache 150, all data objects (e.g., functions 152) that depend on the data type 157A.

Note that, in various embodiments, the request received at element 502 may be sent as part of a DDL statement executed on the database server 105. For example, in some embodiments, a user application may issue a DDL statement to modify the data type 157A, which, when committed, may cause a database event message to be sent to the function cache 150 where it may be picked up by the dependency management module 170.

At 504, in the illustrated embodiment, in response to the request, the dependency management module 170 accesses a first inverted index that specifies a mapping between a plurality of data types 157 and corresponding functions 152, from the function cache 150, that depend on the plurality of data types 157. For example, in response to the request, the dependency management module 170 may access the data type-dependency inverted index 158, which may be stored and maintained in the function cache 150 (as in the embodiment depicted in FIG. 1) or in any other suitable storage location that is accessible to the dependency management module 170.

At 506, in the illustrated embodiment, the dependency management module 170 uses the first inverted index to identify a set of the plurality of functions 152 that depend on the first data type 157. For example, as described above with reference to FIG. 2, the data type-dependency inverted index 158 includes entries corresponding to multiple different data types 157, where, in a given entry, an identifier for a data type 157 is used as an index key 202 and the associated value for the given entry is a function list 204 specifying the function(s) 152 that depend on that data type 157. Continuing with the example above, the dependency management module 170 may use the data type-dependency inverted index 158 to identify functions 152A, 152B, and 152C as those functions that depend on data type 157A.

Method 500 then proceeds to element 508, which, in the illustrated embodiment, includes sub-elements 510-514. More specifically, in FIG. 5, for each of the functions 152 (denoted $F_i$) in the set of functions 152 identified using the inverted index, method 500 includes performing the operations included in sub-elements 510-514. In the current non-limiting example, for instance, dependency management module 170 may perform sub-elements 510-514 for each of functions 152A, 152B, and 152C that were identified at element 506. For example, for function 152A, dependency management module 170 may, at sub-element 510, access function 152A's data type-dependency list 154A that specifies the data types 157 on which the function 152A depends.

At 512, in the illustrated embodiment, the dependency management module 170, for each of data type $T_j$ in the data type-dependency list, looks up $T_j$ in the first inverted index and removes references to $F_i$ in $T_j$'s function list in the first inverted index. In the current example, function 152A depends only on data type 157A. Accordingly, at 512, dependency management module 170 looks up data type 157A in the data type-dependency inverted index 158 and removes references to function 152A from the function list 204A corresponding to data type 157A. As indicated in FIG. 5, in instances in which a function 152's data type-dependency list 154 includes multiple data types 157, dependency module 170 may repeat sub-element 512 for each data type 157 in the data type-dependency list 154. Note that, in various embodiments, sub-elements 510 and 512 may be performed so as to maintain the accuracy of the data type-dependency inverted index 158 as functions 152 are invalidated from the function cache 150.

At 514, in the illustrated embodiment, dependency management module 170 invalidates (e.g., physically deletes) the function Fi from the function cache 150. In the current example, dependency management module 170 may delete function 152A from the function cache 150 during a first iteration of sub-element 514, delete function 152B from the function cache 150 during a second iteration of sub-element 514, and delete function 152C from the function cache 150 during a third iteration of sub-element 514.

Note that, in various embodiments, method 500 may also include adding one or more entries to the first inverted index. For example, in some embodiments, prior to receiving the request to invalidate at element 502, method 500 may include receiving a notification message indicating that the first data type (e.g., data type 157A) has been created and, in response to this notification message, method 500 may include creating an entry in the first inverted index corresponding to this first data type. For example, in response to a notification indicating that data type 157A has been created, method 500 may include creating a corresponding entry in data type-dependency inverted index 158, using an identifier for data type 157A as an index key 202 for that entry. Further, as functions are compiled that utilize the first data type, the entry corresponding to the first data type may be updated accordingly to identify those functions that depend on the first data type. For example, as functions 152 (e.g., function 152A, function 152B, and 152C, in the non-limiting embodiment of FIG. 2) are compiled that utilize data type 157A, the function list 204A corresponding to data type 157A may be updated accordingly to reflect these dependencies between the functions 152A-152C and the data type 157A.

Figure 6:
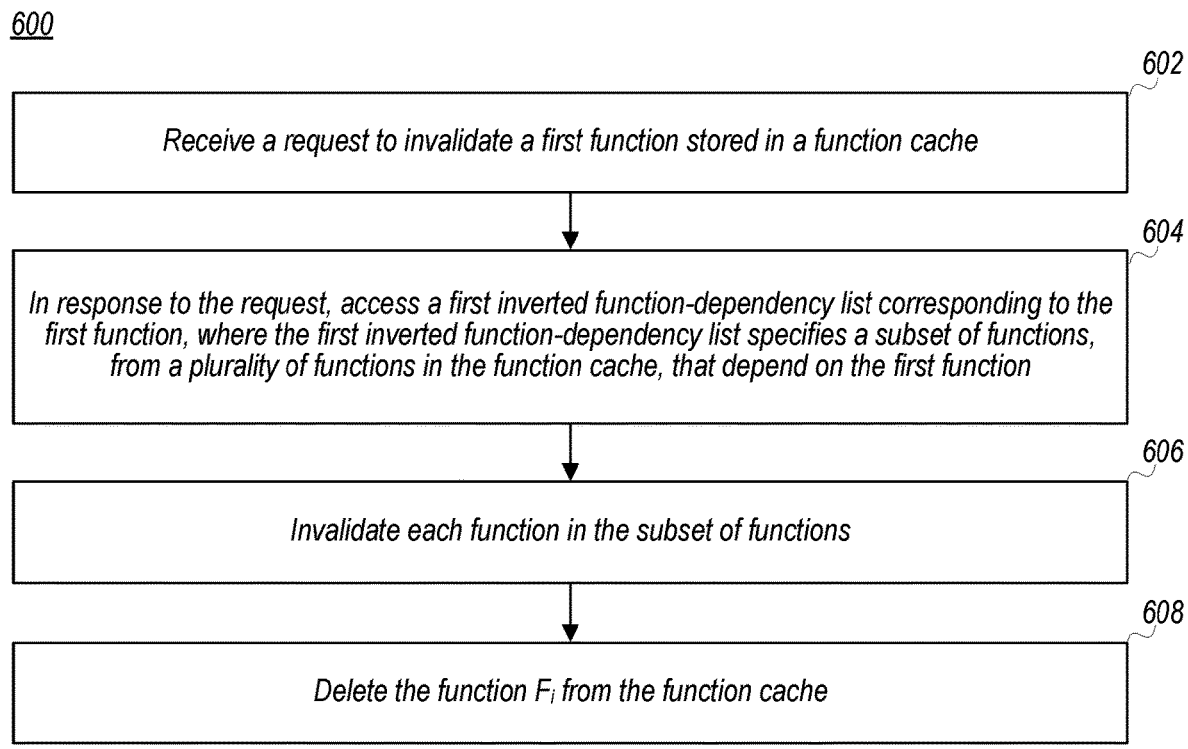
FIG. 6 is a flow diagram illustrating an example method for invalidating one or more functions based on their dependency on an identified function, according to some embodiments.

Referring now to FIG. 6, a flow diagram illustrating an example method 600 for invalidating one or more functions based on their dependency on an identified function is depicted, according to some embodiments. In various embodiments, method 600 may be performed by dependency management module 170 of FIG. 1 to invalidate one or more functions 152 from the function cache 150 in response to a modification to one of the other functions 152. For example, server system 102 may include (or have access to) a non-transitory, computer-readable medium having program instructions stored thereon that are executable by the server system 102 to cause the operations described with reference to FIG. 6. In FIG. 6, method 600 includes elements 602-608. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the dependency management module 170 receives a request to invalidate a first function ($F_1$) stored in the function cache 150. For example, referring again to the non-limiting example depicted in FIGS. 2-3, the dependency management module 170 may receive a request (e.g., as a result of a DDL commit) to invalidate function 152A from the function cache 150. Note that, in some embodiments, the request received at element 602 may be received independent of any changes to any of the data types 157. In other embodiments, however, the request received at element 602 may be initiated by the invalidation of a data type 157 on which the first function depends. For example, in some embodiments, method 500 of FIG. 5 and method 600 of FIG. 6 may be interrelated. In one non-limiting example, element 514 of method 500 may initiate the request to invalidate the first function received at element 602 of method 600.

At 604, in the illustrated embodiment, in response to the request, the dependency management module 170 accesses a first inverted function-dependency list corresponding to the first function $F_1$, where the first inverted function-dependency list specifies a subset of functions, from a plurality of function 152 in the function cache 150, that depend on the first function $F_1$. For example, the dependency management module 170 may access function 152A's inverted function-dependency list 156A, which, in the depicted embodiment, indicates that function 152B depends on function 152A.

At 606, in the illustrated embodiment, the dependency management module 170 invalidates each function $F_i$ in the subset of functions 152 that were identified at element 604. In the current example, the dependency management module 170 may recursively invalidate function 152B and any functions 152 that depend on function 152B. Stated differently, in some embodiments, invalidating the subset of functions identified at element 604 may include invalidating a second subset of functions, from the function cache 150, that depend on the first subset of functions. For example, in invalidating function 152B, the dependency management module 170 may repeat one or more elements of method 600, such as elements 604-608. In the current example, the dependency management module 170, at element 606, may determine that function 152B is to be invalidated due to its dependency on function 152A. Dependency management module 170 may then proceed to element 604, where it may access the function 152B's inverted function-dependency list 156B, which, in the depicted example, indicates that function 152C depends on function 152B. Dependency management module 170 may then proceed again to element 606, where it may determine that function 152C is to be invalidated from the function cache 150.

Again, in the current example, the dependency management module 170 may proceed to element 604 where it may access the function 152C's inverted function-dependency list 156C, which, in FIG. 3, indicates that no additional functions 152 depend on function 152C. The dependency management module 170 may then proceed to element 606, where it may determine that there are no functions 152 that depend on function 152C to invalidate. The dependency management module 170 may then proceed to element 608, where it deletes the function $F_i$ under consideration (function 152C, in the current example) from the function cache 150. Continuing with the current non-limiting example, the flow of execution may then return back to the consideration of function 152B. Having invalidated all of the functions 152 that depend on function 152A, the dependency management module 170 may, at element 608, physically delete function 152B from the function cache 150. Then, in the current example, flow of execution may return back to the consideration of the original function identified in the request received at element 602 (e.g., function 152A). Having invalidated all of the functions 152 that depend (directly and indirectly) on function 152A, the dependency management module 170 may, at element 608, physically delete function 152A from the function cache 150.

In the example described above, method 600 is used to invalidate three functions 152 from the function cache 150. Note, however, that this simplified example is provided merely to aid in understanding. In various embodiments, method 600 may be used to invalidate many (e.g., hundreds, thousands, tens of thousands, etc.) interrelated functions 152 from the function cache 150. As this example demonstrates, by using the disclosed techniques, the dependency management module 170 may efficiently identify the appropriate functions 152 for invalidation using the inverted function-dependency lists 156, saving time and computational resources during the invalidation process.

Figure 7:
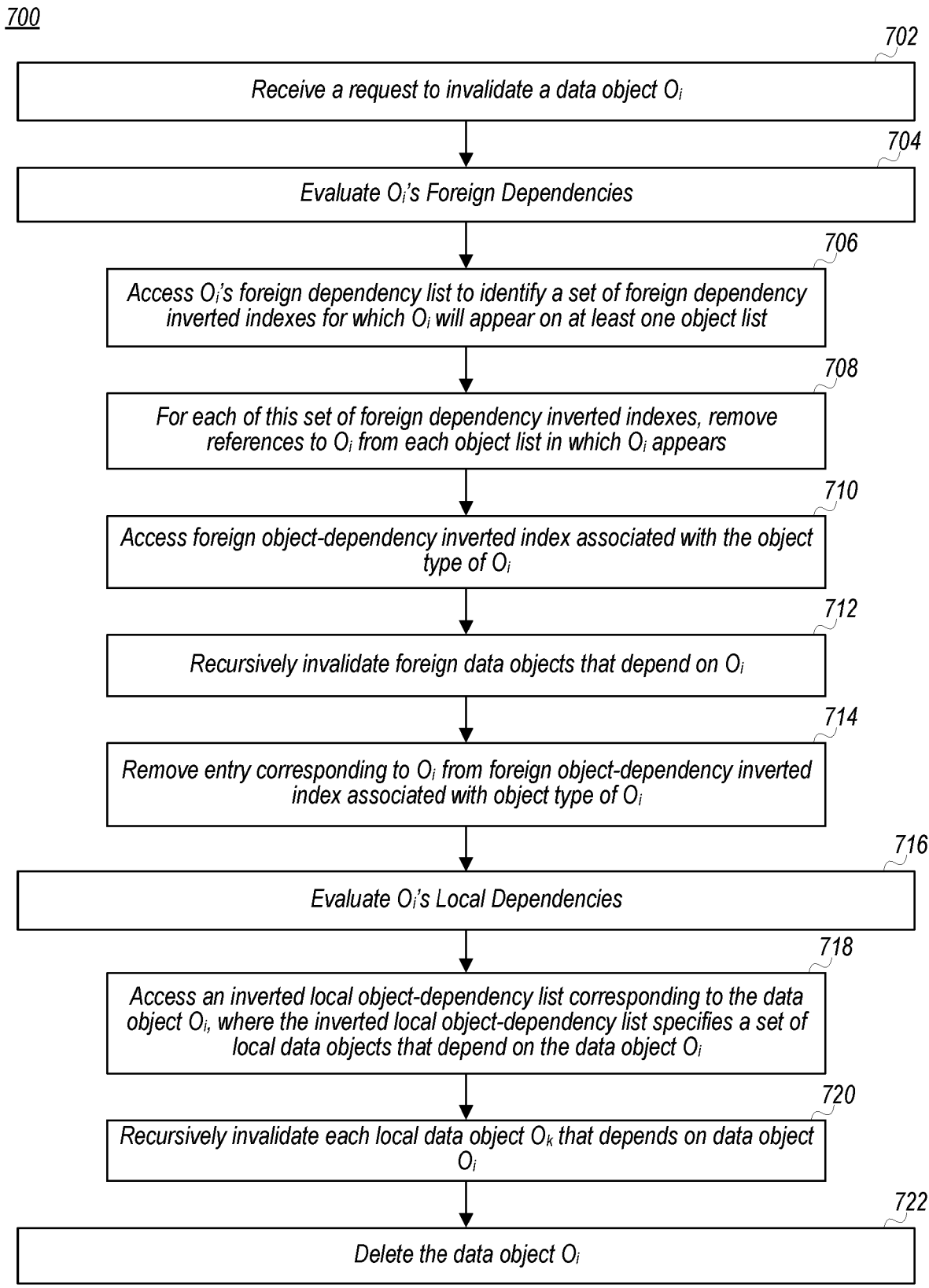
FIG. 7 is a flow diagram illustrating an example method for invalidating a data object, according to some embodiments.

Referring now to FIG. 7, a flow diagram illustrating an example method 700 for invalidating a data object $O_i$ is depicted, according to some embodiments. In various embodiments, method 700 may be performed by dependency management module 170 of FIG. 1 to invalidate one or more data objects (e.g., from the function cache 150 or from any other storage location). For example, server system 102 may include (or have access to) a non-transitory, computer-readable medium having program instructions stored thereon that are executable by the server system 102 to cause the operations described with reference to FIG. 7. In FIG. 7, method 700 includes elements 702-722. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the dependency management module 170 receives a request to invalidate a data object Oi. For example, with reference to the embodiment depicted in FIG. 4, the dependency management module 170 may receive a request to invalidate data object 402A. At 704, in the illustrated embodiment, the dependency management module 170 evaluates $O_i$'s foreign dependencies. In the depicted embodiment, element 704 includes sub-elements 706-714. Note, however, that this embodiment is provided merely as one non-limiting example. In other embodiments, element 704 may include additional, fewer, or different sub-elements, as desired.

At 706, in the illustrated embodiment, the dependency management module 170 accesses $O_i$'s foreign dependency list to identify a set of foreign dependency inverted indexes for which $O_i$ will appear on at least one object list. For example, the dependency management module 170 may access the foreign dependency list 450A to identify the foreign dependency inverted indexes 470 for which data object 402A will appear in at least one object list. In this example, the foreign dependency list 450A include a list of identifiers of foreign data objects on which the data object 402A depends, specifically data objects 405B and 408B and data objects 406C, 407C, 409C, and 410C. Accordingly, in this non-limiting embodiment, data object 402A will appear in foreign dependency inverted index 470B twice (in object lists associated with data objects 405B and 408B) and data object 402A will appear in foreign dependency inverted index 470C four times (in object lists associated with data objects 406C, 407C, 409C, and 410C).

Method 700 then proceeds to element 708 where, for each inverted index in the set of foreign dependency inverted indexes identified at element 706, the dependency management module 170 removes references to Oi from each object list in which Oi appears. Continuing with the current example, at 708, the dependency management module 170 may remove references to data object 402A from object lists associated with data objects 405B and 408B in foreign dependency inverted index 470B and from object lists associated with data objects 406C, 407C, 409C, and 410C in foreign dependency inverted index 470C.

At 710, in the illustrated embodiment, the dependency management module 170 accesses a foreign object-dependency inverted index associated with the object type of $O_i$. Continuing with the current example, the dependency management module 170 may access foreign dependency inverted index 470A that is associated with object type A. As noted above, in various embodiments, the foreign dependency inverted index 470A may be used to track dependencies between data objects of object type A and foreign data objects that depend on the data object(s) of object type A. For example, in the depicted embodiment, the foreign dependency inverted index 470A may identify one or more foreign data objects that depend on data object 402A. At 712, in the illustrated embodiment, the dependency management module 170 recursively invalidates the foreign data objects that depend on data object $O_i$. For example, in the current example, the dependency management module 170 may delete (e.g., from the function cache 150) each of the foreign data objects that are identified in the foreign dependency inverted index 470A as depending on data object 402A. At 714, in the illustrated embodiment, the dependency management module 170 removes, from the foreign object-dependency inverted index associated with the object type of $O_i$, an entry corresponding to $O_i$. For example, the dependency management module 170 may delete an entry in the foreign dependency inverted index 470A that corresponds to the data object 402A.

At 716, in the illustrated embodiment, the dependency management module 170 evaluates $O_i$'s local dependencies. In the depicted embodiment, element 716 includes sub-elements 718-720. Note, however, that this embodiment is provided merely as one non-limiting example. In other embodiments, element 716 may include additional, fewer, or different sub-elements, as desired. At 718, in the illustrated embodiment, the dependency management module 170 accesses an inverted local object-dependency list corresponding to the data object $O_i$, where the inverted local object-dependency list specifies a set of local data objects $O_k$ that depend on the data object $O_i$. For example, the dependency management module 170 may access the inverted local dependency list 460A that identifies the data objects (data objects 403A and 404A, in the depicted embodiment) that depend on data object 402A. At 720, in the illustrated embodiment, the dependency management module 170 recursively invalidates each of the local data objects $O_k$ that depend on the data object $O_i$. For example, the dependency management module 170 may recursively invalidate both of data objects 403A and 404A, in the depicted embodiment. At 722, in the illustrated embodiment, the dependency management module 170 may then delete the data object $O_i$ identified in the request of element 702. Continuing with the current example, the dependency management module 170 may delete the data object 402A from the function cache 150.

Example Computer System

Figure 8:
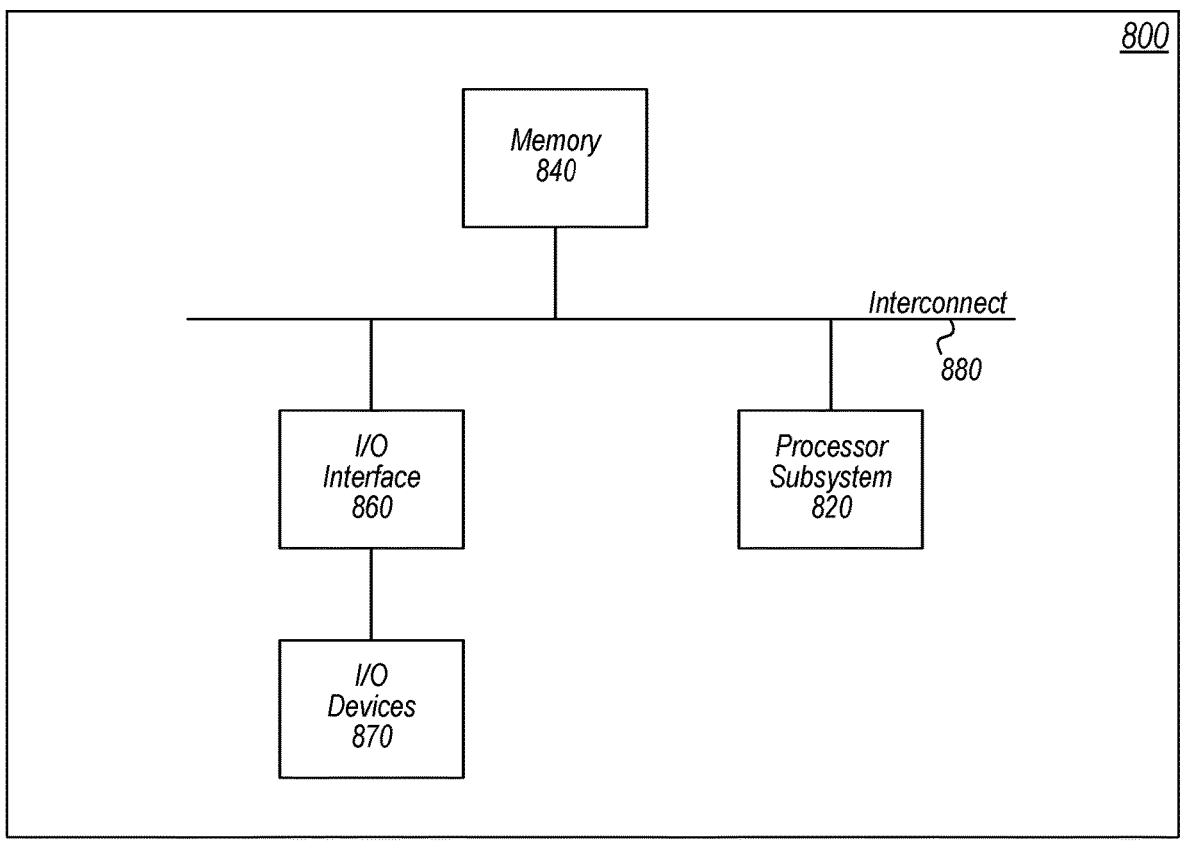
FIG. 8 is a block diagram illustrating an example computer system, according to some embodiments.

Referring now to FIG. 8, a block diagram of an example computer system 800 is depicted, which may implement one or more computer systems, such as server system 102 (or one or more computer systems within server system 102) of FIG. 1, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause system 800 perform various operations described herein. System memory 840 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e., something physical). More specifically, this formulation is used to indicate that this structure is arranged to perform the one or more tasks during operation. A structure can be said to be "configured to" perform some task even if the structure is not currently being operated A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., cache management module 160 or dependency management module 170). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
   maintaining, by a data storage system of a server system, a cache operable to store data objects that are accessible by a plurality of applications hosted by the server system, wherein the data objects include a first data object of a first object type; and
   managing dependencies between the data objects, by the data storage system, using an inverted index that specifies a mapping between a first set of data objects of the first object type and a second set of data objects that depend on the first set of data objects, wherein the managing the dependencies includes:
      receiving a request to invalidate the first data object; and
      using the inverted index to identify a subset of the second set of data objects that depend on the first data object.

2. The method of claim 1, wherein the managing the dependencies further includes:
   accessing a first foreign object-dependency list associated with the first data object; and
   based on the first foreign object-dependency list, identifying a set of foreign dependency inverted indexes for which the first data object appears on at least one object list.

3. The method of claim 2, wherein the managing the dependencies further includes:
   for one or more of the set of foreign dependency inverted indexes, removing references to the first data object from the at least one object list.

4. The method of claim 1, wherein each of the second set of data objects are of an object type other than the first object type, and wherein the managing the dependencies further includes:
   recursively invalidating the subset of the second set of data objects in the cache such that the subset of data objects is inaccessible to the plurality of applications.

5. The method of claim 4, wherein the second set of data objects include:
   a second data object of a second object type; and
   a third data object of a third object type.

6. The method of claim 1, wherein the managing the dependencies further includes:
   using an inverted local object-dependency list, evaluating local dependencies between the first data object and a set of local data objects, of the first object type, that depend on the first data object.

7. The method of claim 6, wherein the managing the dependencies further includes:
   identifying the set of local data objects that depend on the first data object using the inverted local object-dependency list; and
   recursively invalidating each of the set of local data objects.

8. The method of claim 1, wherein the cache is a function cache operable to store a plurality of functions that are accessible to the plurality of applications, and wherein the managing the dependencies further includes:
   invalidating the first data object from the function cache.

9. A non-transitory, computer-readable medium having instructions stored thereon that are capable of being executed by a server system to cause operations comprising:
   maintaining a cache operable to store data objects that are accessible by a plurality of applications hosted by the server system, wherein the data objects include a first data object of a first object type; and managing dependencies between the data objects using an inverted index that specifies a mapping between a first set of data objects of the first object type and a second set of data objects that depend on the first set of data objects, wherein the managing the dependencies includes:
- receiving a request to invalidate the first data object; and
- using the inverted index to identify a subset of the second set of data objects that depend on the first data object.

10. The non-transitory, computer-readable medium of claim 9, wherein the managing the dependencies further includes:
- accessing a first foreign object-dependency list associated with the first data object; and
- based on the first foreign object-dependency list, identifying a set of foreign dependency inverted indexes for which the first data object appears on at least one object list.

11. The non-transitory, computer-readable medium of claim 10, wherein the managing the dependencies further includes:
- for one or more of the set of foreign dependency inverted indexes, removing references to the first data object from the at least one object list.

12. The non-transitory, computer-readable medium of claim 9, wherein each of the second set of data objects are of an object type other than the first object type, and wherein the managing the dependencies further includes:
- recursively invalidating the subset of the second set of data objects in the cache such that the subset of data objects is inaccessible to the plurality of applications.

13. The non-transitory, computer-readable medium of claim 9, wherein the managing the dependencies further includes:
- using an inverted local object-dependency list, evaluating local dependencies between the first data object and a set of local data objects, of the first object type, that depend on the first data object.

14. The non-transitory, computer-readable medium of claim 13, wherein the managing the dependencies further includes:
- identifying the set of local data objects that depend on the first data object using the inverted local object-dependency list; and
- recursively invalidating each of the set of local data objects.

15. A method; comprising:
- providing, by a data storage system of a server system, a cache operable to store data objects that are accessible by a plurality of applications hosted by the server system; and
- managing, by the data storage system, dependencies between the data objects using an inverted index that specifies a mapping between a first set of data objects of a first object type and a second set of data objects that depend on the first set of data objects, wherein, for a first data object, of the first set of data objects, the managing the dependencies includes:
  - maintaining a foreign dependency list that specifies a first subset of data objects, of object types other than the first object type, on which the first data object depends; and
  - maintaining an inverted local dependency list that specifies a second subset of data objects, of the first object type, that depend on the first data object.

16. The method of claim 15, further comprising:
- receiving a request to invalidate the first data object; and
- using the inverted index to identify a subset of the second set of data objects that depend on the first data object.

17. The method of claim 16, further comprising:
- recursively invalidating the subset of the second set of data objects that depend on the first data object; and
- invalidating the first data object.

18. The method of claim 16, further comprising:
- using the foreign dependency list to identify a set of foreign dependency inverted indexes for which the first data object will appear on at least one object list; and
- for each of the set of foreign dependency inverted indexes, removing references to the first data object from each object list in which the first data object is listed.

19. The method of claim 15, further comprising:
- using the inverted local dependency list, evaluating local dependencies between the first data object and a set of local data objects, of the first object type, that depend on the first data object.

20. The method of claim 19, further comprising:
- identifying the set of local data objects that depend on the first data object using the inverted local dependency list; and
- recursively invalidating each of the set of local data objects.

* * * * *